United States Patent
Qureshi et al.

(10) Patent No.: US 12,422,358 B2
(45) Date of Patent: Sep. 23, 2025

(54) OPTICAL SENSOR AND METHOD OF FABRICATING THE OPTICAL SENSOR

(71) Applicant: KING FAHD UNIVERSITY OF PETROLEUM AND MINERALS, Dhahran (SA)

(72) Inventors: Khurram Karim Qureshi, Dhahran (SA); Md. Ahasan Habib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 314 days.

(21) Appl. No.: 18/180,931

(22) Filed: Mar. 9, 2023

(65) Prior Publication Data
US 2024/0302273 A1    Sep. 12, 2024

(51) Int. Cl.
   *G01N 21/41*    (2006.01)
   *C03B 37/027*    (2006.01)
   *G02B 6/02*    (2006.01)

(52) U.S. Cl.
   CPC .......... *G01N 21/41* (2013.01); *C03B 37/0279* (2013.01); *G02B 6/02328* (2013.01); *C03B 2201/02* (2013.01); *C03B 2203/42* (2013.01); *G01N 2201/08* (2013.01)

(58) Field of Classification Search
CPC .................. G02B 6/02328; G01N 21/41–455
See application file for complete search history.

(56) References Cited

U.S. PATENT DOCUMENTS

| | | | |
|---|---|---|---|
| 7,953,309 B2 * | 5/2011 | Mori ................. | G02B 6/02347 65/393 |
| 2002/0001445 A1 * | 1/2002 | Hasegawa .......... | G02B 6/02338 385/125 |
| 2004/0031435 A1 | 2/2004 | Park | |
| 2004/0161199 A1 | 8/2004 | Oh et al. | |
| 2005/0025965 A1 * | 2/2005 | Sanghera ............ | C03B 37/0122 428/364 |
| 2006/0098694 A1 * | 5/2006 | Hongo ................ | G02B 6/02347 385/125 |

(Continued)

FOREIGN PATENT DOCUMENTS

| CN | 101819326 B | 8/2011 |
|---|---|---|
| CN | 107607220 B | 1/2021 |

(Continued)

*Primary Examiner* — Rhonda S Peace
(74) *Attorney, Agent, or Firm* — Oblon, McClelland, Maier & Neustadt, L.L.P.

(57) ABSTRACT

An optical sensor that includes a photonic crystal fiber (PCF) and an optical coupler. The PCF includes a hollow core with a first diameter (Dc), an inner cladding section, and an outer layer surrounding the inner cladding section. The inner cladding section includes a cladding material and a plurality of spaced apart circular-shaped channels disposed in the cladding material surrounding the hollow core. The cladding material includes at least one of glass, ceramic, and glass-ceramic. Each spaced apart circular-shaped channel has substantially the same size and an average diameter (d). A first end of the PCF is in optical communication with a light source and a second end of the PCF is in optical communication with the optical coupler.

8 Claims, 12 Drawing Sheets

(56) References Cited

U.S. PATENT DOCUMENTS

| | | | | |
|---|---|---|---|---|
| 2006/0165361 | A1* | 7/2006 | Hongo | G02B 6/032 385/125 |
| 2009/0032730 | A1* | 2/2009 | Erickson | G02B 6/02347 250/435 |
| 2017/0233283 | A1* | 8/2017 | Ashrafi | G02B 6/02314 385/124 |
| 2021/0141150 | A1* | 5/2021 | Sabert | C03B 37/0122 |
| 2024/0302273 | A1* | 9/2024 | Qureshi | G02B 6/02328 |

FOREIGN PATENT DOCUMENTS

| | | |
|---|---|---|
| CN | 109324370 B | 3/2021 |
| CN | 107860488 B | 6/2021 |

\* cited by examiner

OPTICAL SENSOR AND METHOD OF FABRICATING THE OPTICAL SENSOR

STATEMENT REGARDING PRIOR DISCLOSURE BY THE INVENTORS

The present disclosure was described in "Design of a Highly Sensitive Photonic Crystal Fiber for Sulfuric Acid Detection" published in Micromachines, Volume 13, 670, which is incorporated herein by reference in its entirety.

STATEMENT OF ACKNOWLEDGEMENT

This research was supported by the Deanship of Scientific Research (DSR) at King Fahd University of Petroleum and Minerals under the grant number SB191052.

BACKGROUND

Technical Field

The present disclosure generally relates to optical sensors and more particularly relates to a photonic crystal-fiber based optical sensor and a method of making the optical sensor.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, with the developments in optoelectronics, various waveguides, such as dielectric waveguides, parallel-plate waveguides, metallic waveguides, and Bragg fibers, are used to guide electromagnetic waves from a source to a destination. The dielectric waveguides, alternatively referred to as photonic crystal fibers (PCFs), offer superior propagation characteristics compared to other waveguides mentioned hereinabove. The PCFs can be classified into three major categories, namely solid core, porous core, and hollow core. Although PCFs may be effectively employed in communication applications, only the porous core and the hollow-core PCFs are employed in sensing and spectroscopic applications. Several optical fiber-based gas sensors and liquid sensors have been developed to operate in terahertz regime or visible optical region. The optical sensors that are operated on terahertz regime are known to offer higher sensitivity. Nonetheless, in some studies, a constant refractive index has been used through all terahertz bands, which may be impractical. On the other hand, some studies have proposed optical sensors where a wavelength-dependent refractive index of an analyte was considered, which ensures better reliability of the optical sensor [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021]. Conventionally, a hollow-core PCF-based alcohol sensor is used to offer a sensitivity of 89% with negligible confinement loss at 1.55 µm operating wavelength. However, several optical fiber-based chemical sensors are used to operate on a same principle (such as, spectroscopy) [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021]. Further, several metal-coated plasmonic sensors are also developed in the art which cater excellent sensing characteristics. Additionally, a hybrid core fused silica-based chemical sensor is known to identify a concentration level of sulfuric acid [See: E. Podder, M. B. Hossain, R. H. Jibon, A. A. M. Bulbul, and H. S. Mondal, "Chemical sensing through photonic crystal fiber: sulfuric acid detection," Frontiers in Optoelectronics, vol. 12, pp. 372-381, 2019]. The hybrid core fused silica-based chemical sensor may achieve a sensitivity of only 64% with negligible attenuation at optimum structural conditions. However, a structure of the hybrid core fused silica-based chemical sensor is complicated and creates challenges to be produced in a laboratory due to different shaped air holes in a hollow core thereof.

Sulfuric acid is widely used in various industries as the primary raw material for manufacturing. It is used to produce phosphate fertilizers, inorganic pigments, and other chemicals [See: J. F. Wagner, Mechanical properties of clay and clay minerals. Develop. in clay sci. 5(2013) 347-381]. Different industrial applications require sulfuric acid with varying concentrations, which are achieved by diluting the acid with water. The level of dilution should be determined before using the acid for any production.

In view of the forgoing, one object of the present disclosure is to describe a PCF based optical sensor to determine the concentration of an analyte such as sulfuric acid diluted in water. A further objective of the present disclosure is to provide a method for making the PCF based optical sensor. A third objective of the of the present disclosure is to provide a method of determining a concentration of an analyte in a composition.

SUMMARY

According to one aspect of the present disclosure, an optical sensor is provided. The optical sensor includes a photonic crystal fiber (PCF) and an optical coupler. The PCF includes a hollow core with a first diameter (Dc), an inner cladding section, and an outer layer surrounding the inner cladding section. The inner cladding section includes a cladding material and a plurality of spaced apart circular-shaped channels disposed in the cladding material surrounding the hollow core. In some embodiments, the cladding material includes at least one of glass, ceramic, and glass-ceramic. In some embodiments, each spaced apart circular-shaped channel has substantially the same size and an average diameter (d). In some embodiments, a first end of the PCF is in optical communication with a light source. In some embodiments, a second end of the PCF is in optical communication with the optical coupler.

In some embodiments, the cladding material is fused silica. In some embodiments, the fused silica has a refractive index in a range of 1.4 to 1.5 at wavelength of 0.5 to 2.0 micrometers (µm).

In some embodiments, the outer layer acts as a perfectly matched layer (PML). In some embodiments, the outer layer has a circular or substantially circular cylindrical shape cross section around the inner cladding section.

In some embodiments, the circular-shaped channels are arranged parallel to the axis direction of the PCF over its entire length.

In some embodiments, the circular-shaped channels disposed in the cladding material are arranged in concentric rings around the hollow core, and all of the concentric rings are having equal distance from one another. In some embodiments, a number of the concentric rings is any integer from 1 to 10. In some embodiments, the number of concentric rings is 5.

In some embodiments, a distance (p) between two adjacent circular-shaped channels measured from the centers of two nearest neighboring circular-shaped channels is in a range of 2 to 4 µm.

In some embodiments, the first diameter (Dc) of the hollow core is in a range of 1p to 1.5p.

In some embodiments, the average diameter (d) of the circular-shaped channels is in a range of 0.4p to 0.8p.

According to another aspect of the present disclosure, a method of determining a concentration of an analyte in a composition is provided. The method includes passing the composition through an optical sensor via a hollow core thereof. The method further includes exposing the composition in the hollow core to a laser light such that a portion of the laser light is propagated through the hollow core of the optical sensor and the composition to form propagated light. The method also includes detecting the propagated light via an optical coupler.

In some embodiments, the analyte includes a molecule having a formula (I)

[I]

In some embodiments, R is selected from a group consisting of a hydroxy group, an aryl group, a trifluoromethyl group, a C1 to C6 alkyl group, and a C1 to C6 alkoxy group.

In some embodiments, the analyte is sulfuric acid. In some embodiments, the sulfuric acid is optionally present in the composition at a concentration of up to 50 wt. % based on a total weight of the composition.

In some embodiments, the composition in the hollow core is exposed to the laser light having a wavelength in a range of 0.5 to 2.0 µm. In some embodiments, the method has a sensitivity of 88% to 98% towards sulfuric acid presented in a sulfuric acid solution having a concentration of 5 wt. % to 45 wt. %

In some embodiments, when the composition in the hollow core is exposed to the laser light having a wavelength of 1.1 µm, the optical sensor is associated with a numerical aperture (NA) value in a range of 0.2 to 0.35.

In some embodiments, when the composition in the hollow core is exposed to the laser light having a wavelength of 1.1 µm, the optical sensor is associated with a low confinement of $10^{-15}$ dB/m to $10^{-5}$ dB/m.

In some embodiments, when the composition in the hollow core is exposed to the laser light having a wavelength of 1.1 µm, the optical sensor is associated with an effective area of $5 \times 10^{-12}$ m$^2$ to $7.5 \times 10^{-12}$ m$^2$.

In some embodiments, when the composition in the hollow core is exposed to the laser light having a wavelength of 1.1 µm, the optical sensor is associated with a spot size of 1 to 2 µm.

In some embodiments, when the composition in the hollow core is exposed to light having a wavelength of 1.1 µm, the optical sensor is associated with a single-mode propagation and a V parameter ($V_{eff}$) value less than or equal to 2.405.

According to yet another aspect of the present disclosure, a method of making an optical sensor is provided. The method includes providing a fused silica preform having a longitudinal central opening and pressurizing the longitudinal central opening with a gas. The method further includes drawing the fused silica preform into a fiber at an elevated temperature while maintaining pressure of the gas to retain the longitudinal central opening.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
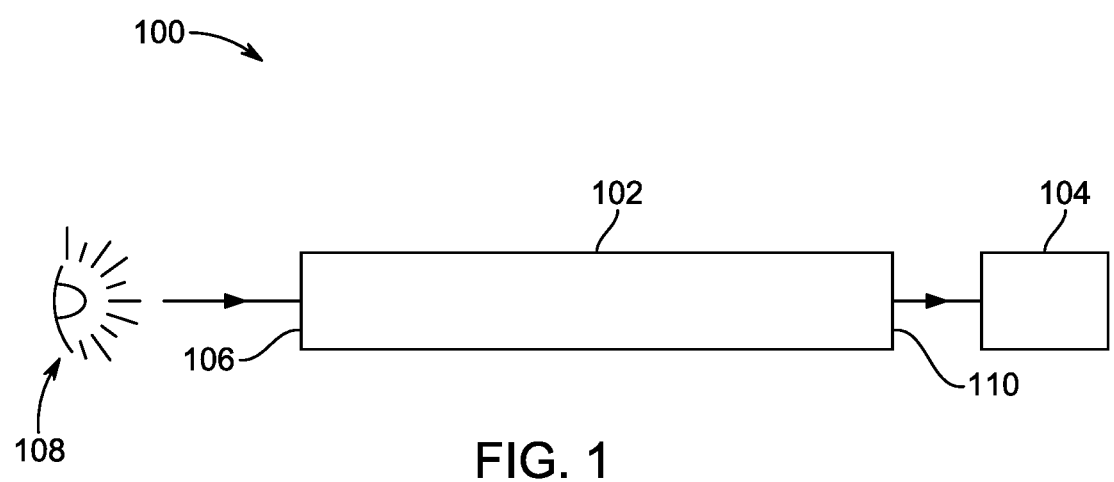
FIG. 1 illustrates an exemplary diagram of an optical sensor, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 illustrates an exemplary diagram of an optical sensor 100 (hereinafter referred to as "the sensor 100"), according to an embodiment of the present disclosure. The sensor 100 includes a photonic crystal fiber (PCF) 102 (hereinafter referred to as "the PCF 102") and an optical coupler 104. A photonic crystal fiber (also referred to as microstructure fiber) is an optical fiber which obtains its waveguide properties not from a spatially varying glass composition but from an arrangement of very tiny and closely spaced air holes which extend through a length thereof. Conventionally, such air holes are obtained by using a preform with holes, made, for example, by stacking capillary and/or solid tubes (stacked tube technique) and inserting them into a larger tube. The optical coupler 104 is an optical device capable of connecting one or more ends of the optical fiber in order to allow transmission of light waves in multiple paths. Often, the optical coupler 104 is used as a device that is capable of combining two or more inputs into a single output and also dividing a single input into two or more outputs.

In some embodiments, suitable optical coupler includes but is not limited to a fused coupler, a wavelength division multiplexing (WDM) coupler, a tapered coupler, a beam splitter coupler, and a fused biconical taper (FBT) coupler.

As used herein, the term "fused coupler," or "fused-fiber coupler" generally refers to a coupler made by fusing two fibers together. A fused coupler may be used in optical systems to split or combine signals. Fusing may include direct contact between fibers or embedment of a plurality of fibers in a common matrix.

As used herein, the term "WDM coupler" generally refers to a coupler that can combine or separate optical signals of different wavelengths. The WDM coupler may be used in fiber optic communications to increase the bandwidth capacity of a single fiber.

As used herein, the term "tapered coupler" generally refers to a coupler that can gradually reduce the diameter of a single fiber to create a fused region that can split or combine optical signals.

As used herein, the term "beam splitter coupler" generally refers to a coupler that can use a partially reflective surface to split an incoming optical signal into two output signals.

As used herein, the term "FBT coupler" generally refers to a coupler that can be used in fiber optic communications for signal splitting and combining.

As illustrated in FIG. 1, a first end 106 of the PCF 102 is disposed in optical communication with a light source 108 and a second end 110 of the PCF 102 is disposed in optical communication with the optical coupler 104. As used herein, the term "optical communication" refers to a communication at a distance or from a distance using light to carry information.

The PCF 102 may be of any cross sectional shape such as a circle, an oval, a triangle, a square, a rectangle, or a hexagon. In some preferred embodiments, the PCF may be a circle at a cross section. In some embodiments, the longest dimension measured from the first end 106 of the PCF 102 to the second end 110 of the PCF 102 may be in a range of 2-150 centimeters (cm), preferably 5-100 cm, preferably 8-50 cm, or even more preferably 10-25 cm. In some embodiments, a thickness of the PCF 102 may be in a range of 1-500 micrometers (μm), preferably 5-300 μm, preferably 10 to 150 μm, or even more preferably 20-80 μm. Other ranges are also possible.

Figure 2:
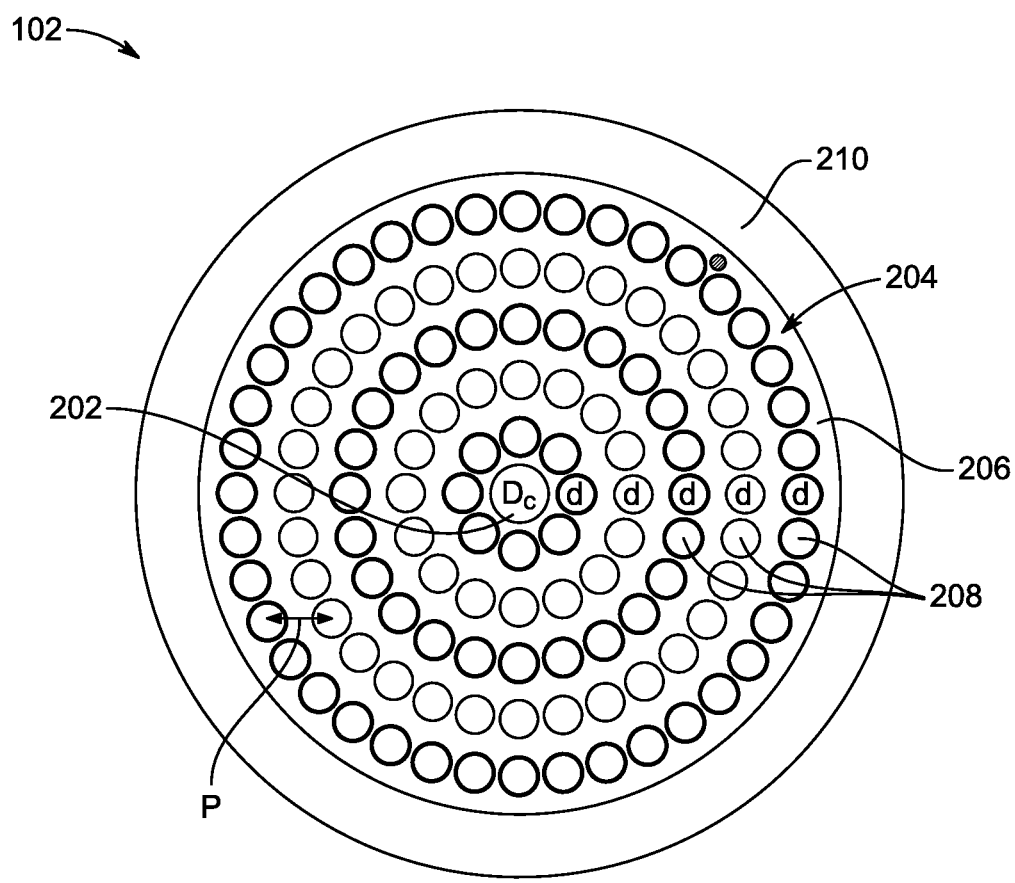
FIG. 2 illustrates a cross-section of a photonic crystal fiber of the optical sensor of FIG. 1, according to certain embodiments of the present disclosure.

FIG. 2 is a cross-section of the PCF 102 illustrating components thereof. The PCF 102 includes a single channel hollow core 202. The single channel hollow core 202 has a first diameter "$D_c$". The PCF 102 further includes an inner cladding section 204. The inner cladding section 204 includes a cladding material 206 and a plurality of spaced apart circular-shaped channels 208. According to an aspect of the present disclosure, the circular-shaped channels 208 are disposed in the cladding material 206 surrounding the hollow core 202. In some embodiments, the circular-shaped channels 208 disposed in the cladding material may be arranged in any shape from a cross-sectional view such as a concentric ring, a concentric annular ring, an ellipse ring, and a polygon ring. The concentric polygon ring includes but is not limited to concentric regular polygon ring, for example, concentric triangular loop, concentric regular pentagon ring, concentric regular hexagon ring, concentric regular heptagon ring, and concentric octagon ring. In some preferred embodiments, the circular-shaped channels 208 disposed in the cladding material are arranged in concentric rings around the hollow core 202. In some embodiments, the concentric rings are concentric spherical annular rings. In some most preferred embodiments, all of the concentric rings are having equal distance from one another.

The circular-shaped channels 208 are embodied as air holes which are configured to create a dielectric environment around the hollow core 202. In some embodiments, the cladding material 206 may exhibit optical transparency of greater than 70%, preferably greater than 80%, preferably greater than 90%, or even more preferably greater than 99% as defined by the transmission of light over the range of from 400-750 nm through a 1 mm thickness of the glass cladding material.

As used herein, the term "dielectric" generally refers to a non-metallic material having insulating properties. In some embodiments, the cladding material 206 includes at least one of glass, ceramic, and glass-ceramic. In some further embodiments, the materials are inorganic dielectric materials including, but not limited to, silicon dioxide, porous silicon dioxide, fused silica, pyrex, glass, fused quartz, rubber, diamond, silicone hydrogel, and a mixture thereof. In some preferred embodiments, the cladding material 206 may be fused silica (amorphous silicon dioxide, $SiO_2$). Fused silica is often used as a base material in the optical fiber owing to various properties thereof. For example, fused silica offers a wide wavelength range with good optical transparency and may be drawn into fibers at reasonably high temperatures whilst exhibiting high mechanical strength against pulling and bending. In an aspect, the fused silica has a refractive index in a range of 1.4 to 1.5, preferably 1.41 to 1.48, preferably 1.42 to 1.48, or even more preferably 1.44 to 1.46, at wavelength of 0.5 to 2.0 μm, preferably 0.7 to 1.8 μm, preferably 0.9 to 1.6 μm, or even more preferably 1.1 to 1.4 μm. Other ranges are also possible. In a second aspect, the fused silica has a thermal coefficient in a range of 5 to 30 parts per million per degree Centigrade (ppm/° C.), preferably 7 to 25 ppm/° C., preferably 9 to 20 ppm/° C., preferably 11 to 15 ppm/° C., or even more preferably about 13 ppm/° C. Other ranges are also possible.

In some embodiments, the cladding material 206 may be hydrogel. As used herein, the term "hydrogel" refers to a network of hydrophilic polymer chains dispersed in water. Hydrogels are absorbent natural or synthetic polymeric networks. Hydrogels also possess a degree of flexibility very similar to natural tissue, due to their significant water content.

The hydrogel may be a biocompatible material, and/or a natural polymer. Exemplary natural polymers include, without limitation, agarose, methylcellulose, and hyaluronan. Exemplary synthetic polymers include, without limitation, silicone (e.g., dimethicone, methicone, phenyl trimethicone, and cyclomethicone), polyacrylamide, polymacon, polyethylene oxide, poly(2-acrylamido-2-methyl-1-propanesulfonic acid), polyvinylpyrrolidone, polyvinyl alcohol, sodium polyacrylate, poly(hydroxyethyl methacrylate), polymethacrylate, polyethylacrylate, polyethylene terephthalate, polymethyl methacrylate, and copolymers thereof.

A porosity of the PCF 102 may be at least 10 vol %, preferably at least 20 vol %, preferably at least 30 vol %, preferably at least 40 vol %, preferably at least 50 vol %, preferably at least 60 vol %, preferably at least 70 vol %, or even more preferably at least 80 vol %, based on a total volume of the photonic crystal fiber. Other ranges are also possible. In one embodiment, the porosity is calculated by taking a photograph of a cross section of photonic crystal fiber, measuring a total void area using the photograph, and calculating the porosity as a ratio of void area with respect to an entire cross sectional area of the photonic crystal fiber. In this embodiment, the porosity may be measured and/or calculated using N2 adsorption/desorption isotherms (e.g., using Barret-Joyner-Halenda or non-local density functional theory), permporometry methods, industrial computed tomography scanning, and imbibition methods.

Further, each spaced apart circular-shaped channel 208 has substantially the same size and an average diameter (d). In some embodiments, as illustrated in FIG. 2, the circular-shaped channels 208 are arranged parallel to an axis direction of the PCF 102 over an entire length thereof. In some embodiments, a distance (p), which is often referred to as pitch, between two adjacent circular-shaped channels 208 measured from the centers of two nearest neighboring circular-shaped channels 208 is in a range of 2 to 4 μm, preferably 2.2 to 3.8 μm, preferably 2.6 to 3.6 μm, preferably 2.8 to 3.4 μm, or even more preferably 3.0 to 3.2 μm. Other ranges are also possible. In some embodiments, the average diameter (d) of the circular-shaped channels 208 is in a range of 0.4p to 0.8p, preferably 0.44p to 0.76p, preferably 0.48p to 0.72p, preferably 0.52p to 0.68p, preferably 0.56p to 0.64p, or even more preferably about 0.6p. Other ranges are also possible. In some embodiments, the first diameter ($D_c$) of the hollow core 202 is in a range of 1p to 1.5p, preferably 1.2p to 1.4p, or even more preferably about 1.3p. Other ranges are also possible. In some embodiments, as shown in FIG. 2, the circular-shaped channels 208 may be arranged in concentric rings around the hollow core 202, and all of the concentric rings may have equal distance from one another. In some embodiments, a number of the concentric rings may be any integer from 1 to 10 inclusively, preferably 2 to 9 inclusively, preferably 3 to 8 inclusively, or even more preferably 4 to 7 inclusively. In some preferred embodiments, the number of concentric rings is 5.

The PCF 102 further includes an outer layer 210 surrounding the inner cladding section 204. The outer layer 210 may be acting a perfectly matched layer (PML), or other types of absorbing boundary conditions to mimic radiation towards infinity. As used herein, the term "perfectly matched layer", or "PML" generally refers to a boundary condition which absorbs the energy without inducing reflections. For example, when a light beam travels through the hollow core 202 of the PCF 102, a fraction of light diverges from hollow core 202, propagates towards the outer surface of the waveguide, and returns to the hollow core 202 due to this back reflection. In some embodiments, at least 60% of that fraction of light is returned to the hollow core 202 based on a total light intensity of that light fraction, preferably at least 70%, preferably at least 80%, preferably at least 90%, preferably at least 95%, or even more preferably at least 99.9% of that fraction of light is returned to the hollow core 202. Other ranges are also possible. In some embodiments, the outer layer 210 may have a circular or substantially cylindrical shape cross section around the inner cladding section 204.

Figure 3:
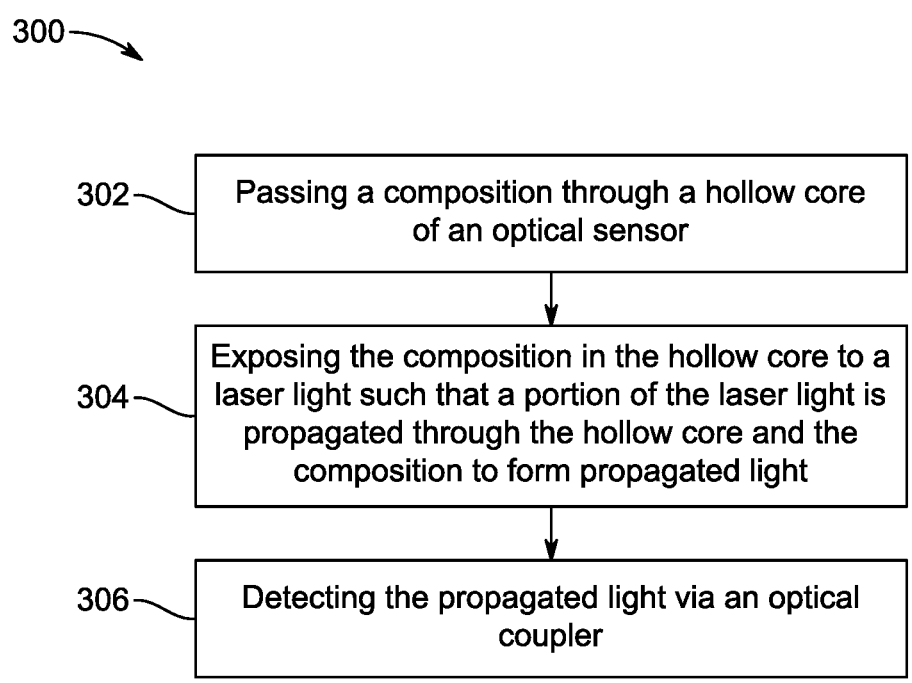
FIG. 3 illustrates a flow chart of a method of determining a concentration of an analyte in a composition using the optical sensor, according to certain embodiments of the present disclosure.

Aspects of the present disclosure also relate to, as illustrated in FIG. 3, a method 300 of determining a concentration of an analyte in a composition. The method 300 is described in conjunction with FIG. 1 and FIG. 2.

At step 302, the method 300 includes passing the composition through the sensor 100 via the hollow core 202. At step 304, the method 300 includes exposing the composition in the hollow core 202 to a laser light such that a portion of the laser light is propagated through the hollow core 202 and the composition to form propagated light. At step 306, the method 300 includes detecting the propagated light via the optical coupler 104.

In one aspect, the analyte may be or include a molecule having a formula (I) provided below, where R is selected from the group consisting of a hydroxy group, an aryl group, a trifluoromethyl group, a C1 to C6 alkyl group, and a C1 to C6 alkoxy group.

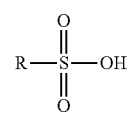

[I]

In some embodiments, the molecule is at least one selected from the group consisting of sulfuric acid, triflic acid, sulfamic acid, aminomethanesulfonic acid, methane sulfonic acid, ethane sulfonic acid, methylsulfamic acid, 3-hydroxypropane-1-sulfonic acid a bisulfate salt, taurine, benzene sulfonic acid, and naphthalene sulfonic acid, ammonium hydrogen sulfate, and sodium hydrogen sulfate.

In an aspect, the analyte may be sulfuric acid. In another aspect, the sulfuric acid may be optionally present in the composition at a concentration of up to 50 wt. % based on a total weight of the composition, preferably up to 40 wt. %, preferably up to 30 wt. %, or even more preferably up to 20 wt. % based on the total weight of the composition. Other ranges are also possible. In some embodiments, when the composition in the hollow core 202 is exposed to the laser light having a wavelength in a range of 0.5 to 2.0 μm, the sensor 100 may be associated with a sensitivity of 88% to 98% towards the sulfuric acid presented in a sulfuric acid solution having a concentration of 5 to 45 wt. %, preferably 10 to 40 wt. %, preferably 15 to 35 wt. %, or even more preferably 20 to 30 wt. %. Other ranges are also possible.

Figure 9:
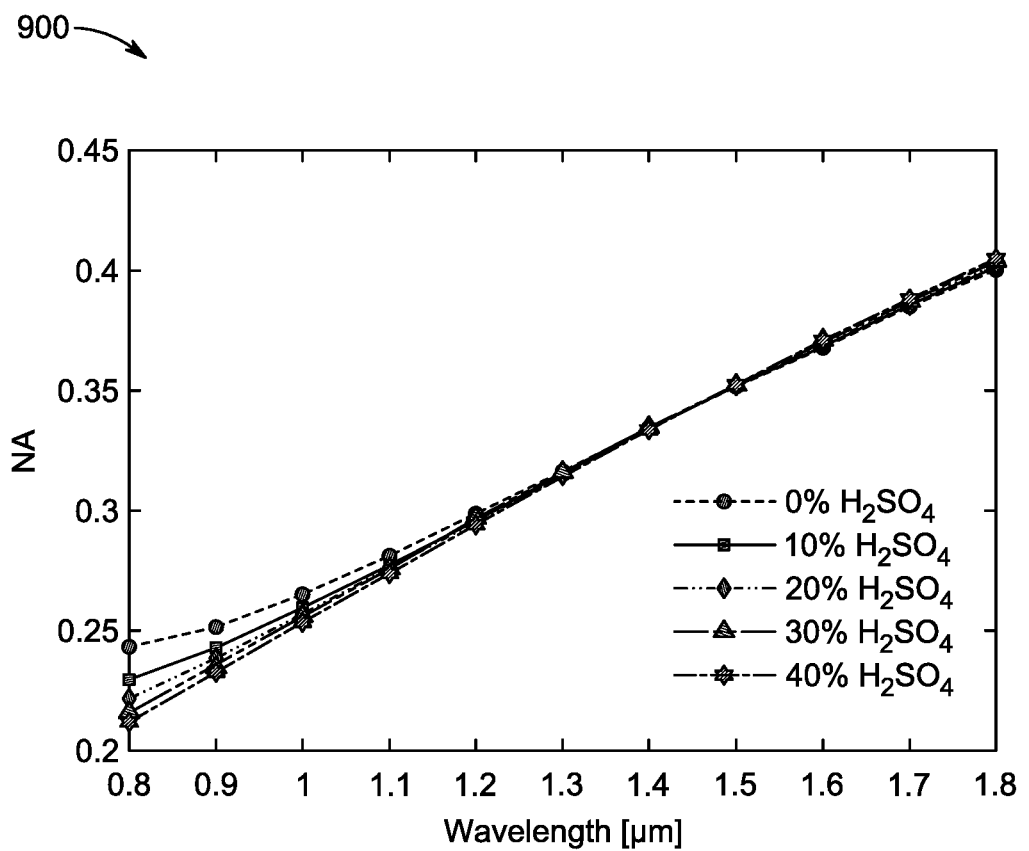
FIG. 9 is a graphical representation of numerical aperture (NA) of the optical sensor as a function of operating wavelengths, according to certain embodiments of the present disclosure.

FIG. 9 illustrates a graphical representation of numerical aperture (NA) of the optical sensor as a function of operating wavelengths. In an aspect, when the composition in the hollow core 202 is exposed to the laser light having a wavelength of 1.1 μm, the sensor 100 may be associated with a numerical aperture (NA) value of 0.2 to 0.35, preferably 0.22 to 0.33, preferably 0.24 to 0.31, preferably 0.26 to 0.29, or even more preferably about 0.28. Other ranges are also possible.

Figure 8:
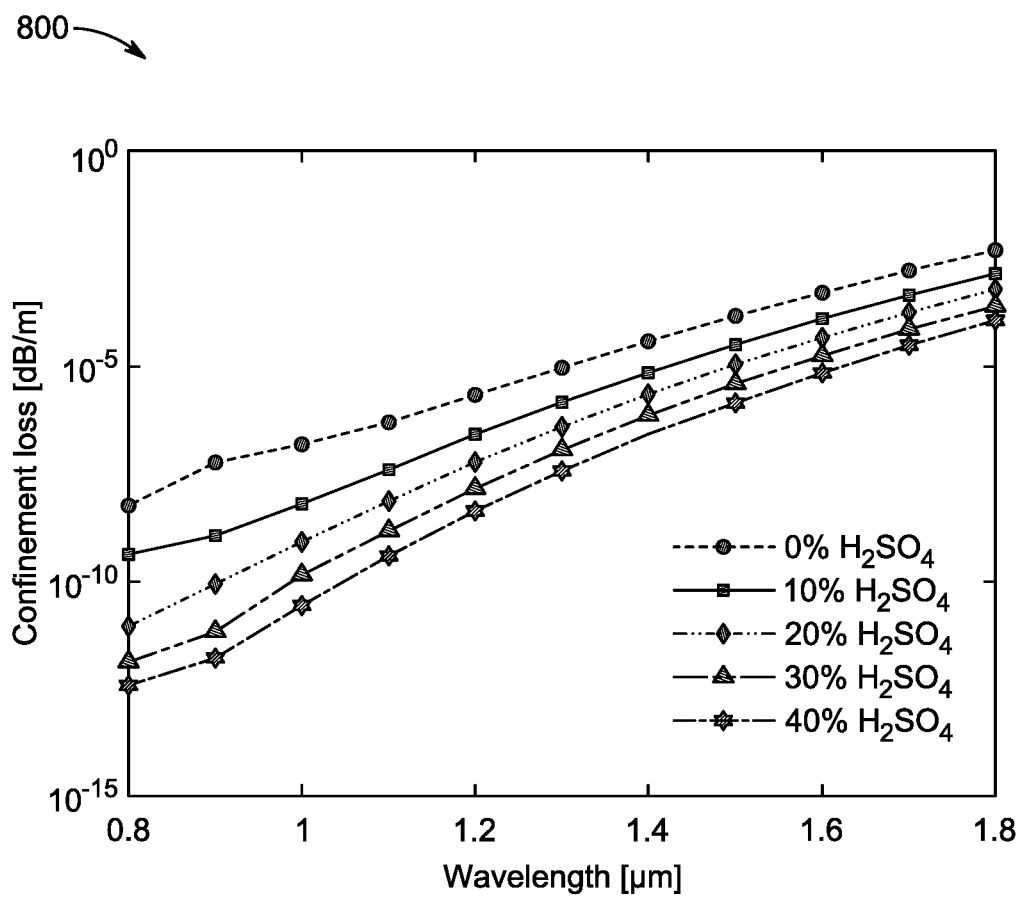
FIG. 8 is a graphical representation of confinement loss of the optical sensor at different operating wavelengths for different concentrations of sulfuric acid, according to certain embodiments of the present disclosure.

FIG. 8 illustrates a graphical representation of confinement loss of the optical sensor at different operating wavelengths for different concentrations of sulfuric acid. In another aspect, when the composition in the hollow core 202 is exposed to the laser light having a wavelength of 1.1 μm, the sensor 100 may be associated with a low confinement of $10^{-15}$ dB/m to $10^{-5}$ dB/m, preferably $10^{-13}$ dB/m to $10^{-7}$ dB/m, or even more preferably $10^{-11}$ dB/m to $10^{-9}$ dB/m. Other ranges are also possible.

Figure 10:
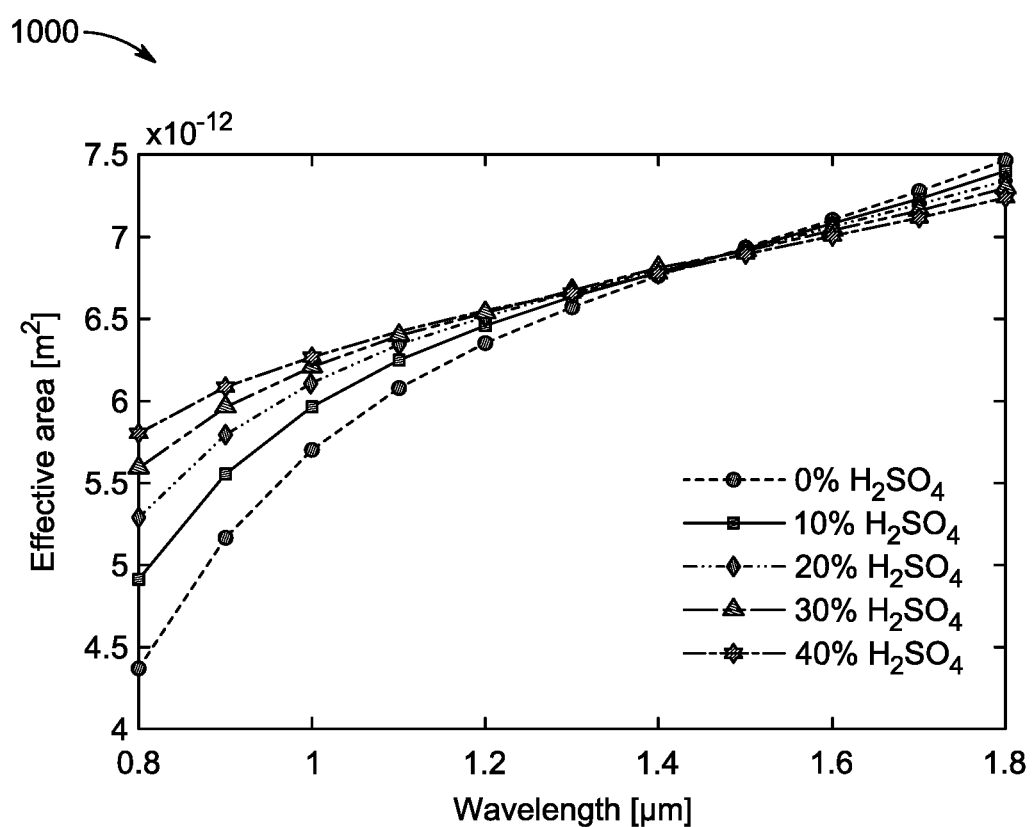
FIG. 10 is a graphical representation of relationship between an effective area of the optical sensor and the operating wavelengths, according to certain embodiments of the present disclosure.

FIG. 10 illustrates a graphical representation of relationship between an effective area of the optical sensor and the operating wavelengths. In another aspect, when the composition in the hollow core 202 is exposed to the laser light having a wavelength of 1.1 μm, the sensor 100 may be associated with an effective area of $5 \times 10^{-12}$ m$^2$ to $7.5 \times 10^{-12}$ m$^2$, preferably $5.2 \times 10^{-12}$ m$^2$ to $7.3 \times 10^{-12}$ m$^2$, preferably $5.4 \times 10^{-12}$ m$^2$ to $7.1 \times 10^{-12}$ m$^2$, preferably $5.6 \times 10^{-12}$ m$^2$ to $6.9 \times 10^{-12}$ m$^2$, preferably $5.8 \times 10^{-12}$ m$^2$ to $6.7 \times 10^{-12}$ m$^2$, or even more preferably $6.0 \times 10^{-12}$ m$^2$ to $6.5 \times 10^{-12}$ m$^2$. Other ranges are also possible.

Figure 12:
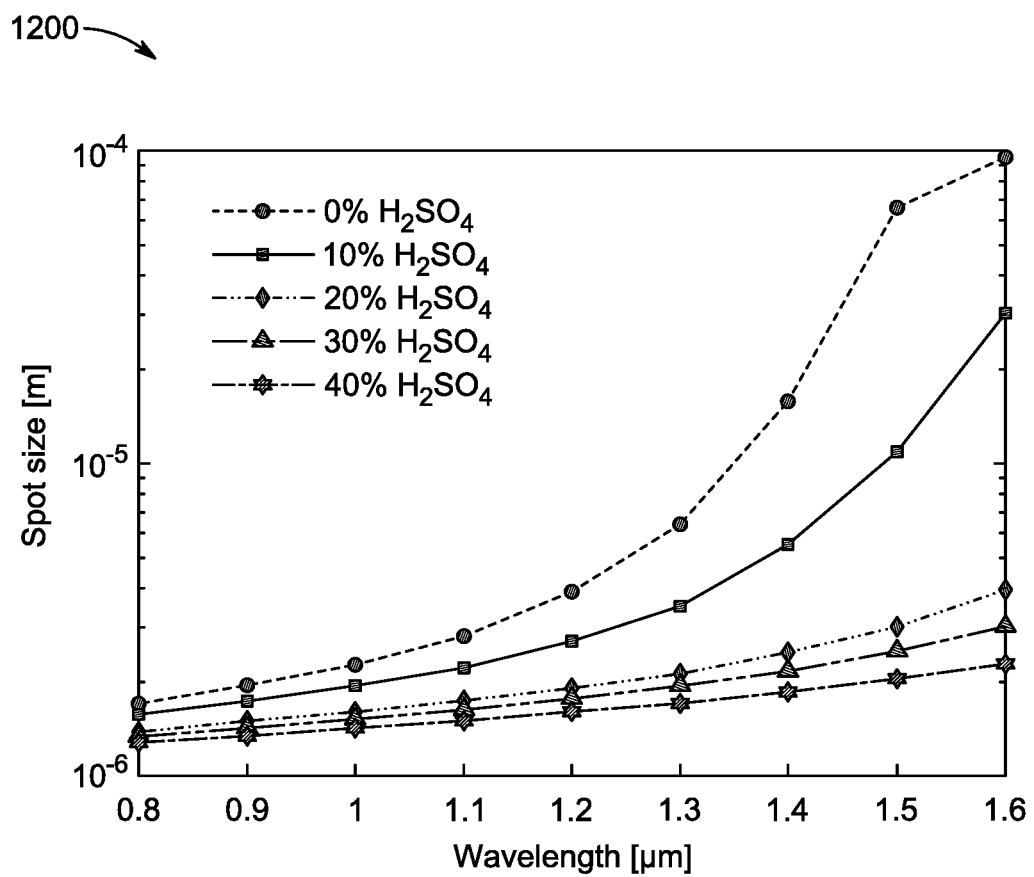
FIG. 12 is a graphical representation of spot size of the optical sensor at different operating wavelengths, according to certain embodiments of the present disclosure.

FIG. 12 illustrates a graphical representation of spot size of the optical sensor at different operating wavelengths. In another aspect, when the composition in the hollow core 202 is exposed to the laser light having a wavelength of 1.1 μm, the sensor 100 may be associated with a spot size of 1 to 2 μm, preferably 1.1 to 1.9 μm, preferably 1.2 to 1.8 μm, preferably 1.3 to 1.7 μm, preferably 1.4 to 1.6 μm, or even more preferably about 1.5 μm. Other ranges are also possible.

Figure 11:
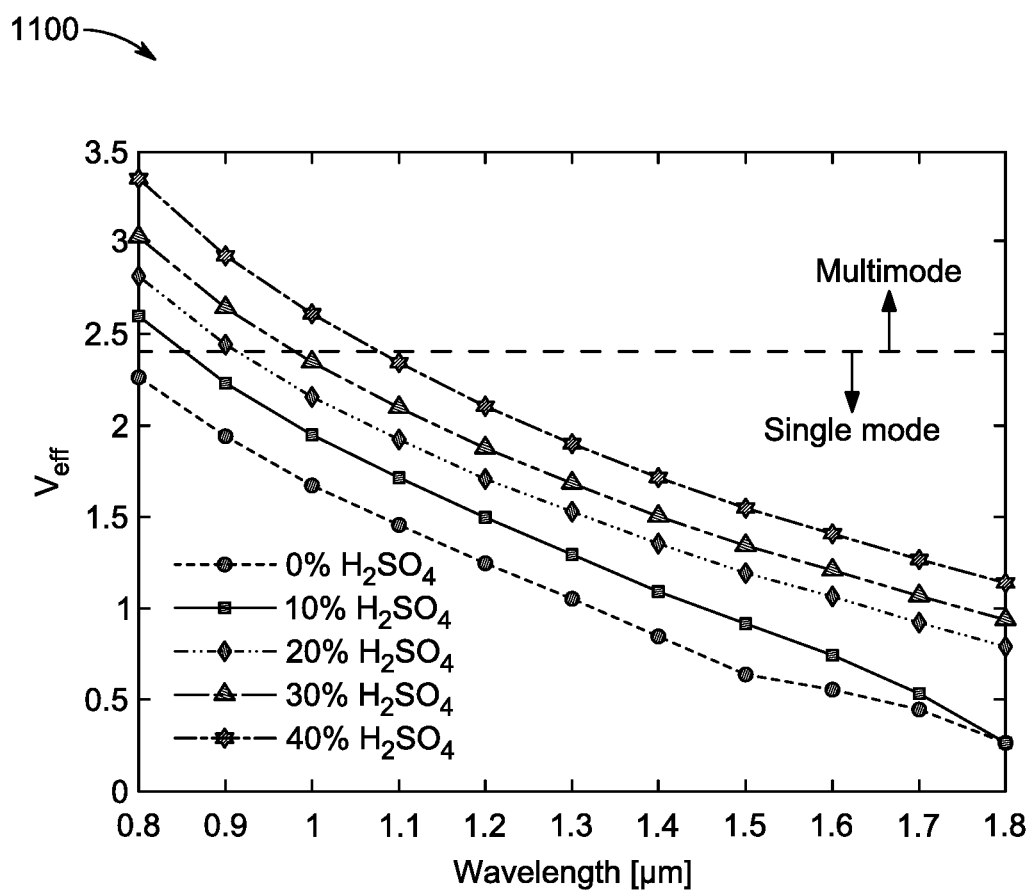
FIG. 11 is a graphical representation of a single-mode propagation parameter at different operating wavelengths, according to certain embodiments of the present disclosure.

FIG. 11 illustrates a graphical representation of a single-mode propagation parameter at different operating wavelengths. In another aspect, when the composition in the hollow core 202 is exposed to the laser light having a wavelength of 1.1 μm, the sensor 100 may be associated with a single-mode propagation and a V parameter ($V_{eff}$) value less than or equal to 3.0, preferably less than or equal to 2.8, preferably less than or equal to 2.6, or even more preferably less than or equal to 2.405. Other ranges are also possible.

Figure 4:
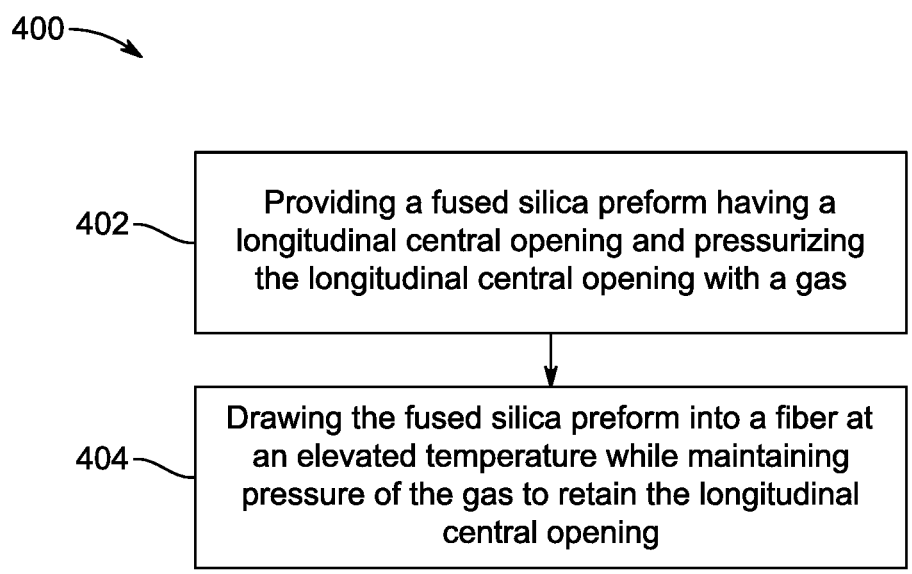
FIG. 4 illustrates a flow chart of a method of making the optical sensor, according to certain embodiments of the present disclosure.

Aspects of the present disclosure also relate to, as illustrated in FIG. 4, a method 400 of making the sensor 100. A conventional photonic crystal fiber may be produced by methods known to those of ordinary skill in art. The method of making the sensor 100 disclosed herein may be similar to the method of make a glass fiber (U.S. Pat. No. 7,077,900B2 assigned to Samsung Electronics Co Ltd, which is incorporated herein by reference in its entirety).

A photonic crystal fiber may use silica as the optical material for the continuous phase, with a refractive index ratio of 1.4 to 1.5. In some embodiments, a photonic crystal fiber may be produced by bundling silica tubes and a silica rod. In some further embodiments, the bundled silica tubes and the silica rod may be arranged in a predetermined manner, such as a concentric ring, a concentric annular ring, an ellipse ring, and a polygon ring. The concentric polygon ring includes but is not limited to concentric regular polygon ring, for example, concentric triangular loop, concentric regular pentagon ring, concentric regular hexagon ring, concentric regular heptagon ring, and concentric octagon ring. In some preferred embodiments, the bundled silica tubes and the silica rod arranged in the predetermined manner may be drawn at a temperature of 1800 to 2500° C., 1900 to 2200° C., or even more preferably about 2000° C. Other ranges are also possible. In some further preferred embodiments, the size of the air holes, the distance between the centers of dispersed phases, and the arrangement shape of the air holes are factors that may determine the production of an optical fiber.

At step 402, the method 400 includes providing a fused silica preform having a longitudinal central opening and pressurizing the longitudinal central opening with a gas. In some embodiments, the gas is at least one selected from the group consisting of selected from helium, argon, nitrogen, and air. In some preferred embodiments, the gas is air. In some further embodiment, air is injected through an inlet of a die containing the fused silica preform. In some further preferred embodiments, the air is distributed in the cladding material 206 to form the circular-shaped channels. In such case, air instead of a separate dispersed phase material is used as a dispersed phase, and the circular-shaped channels are arranged in a predetermined shape can be fabricated without a separate device for injecting a dispersed phase material into the die.

At step 404, the method 400 includes drawing the fused silica preform into a fiber at an elevated temperature while maintaining pressure of the gas to retain the longitudinal central opening. The sensor 100 may be manufactured as all the channels 208 (air holes) are circular in shape. Conventionally, circular-type air holes may be produced with high accuracy in the laboratory setting [See: J. Yang, H. Zhang, X. Zhang, Z. Chen, L. Xi, and W. Zhang, "A hollow core circular photonic crystal fiber mode selective coupler for generating orbital angular momentum modes," Optical Fiber Technology, vo. 64, pp. 102543, 2021; and M. A. Sadath, M. M. Rahman, M. S. Islam, M. S. Hossain, and M. Faisal, "Design optimization of suspended core photonic crystal fiber for polarization maintaining applications," Optical Fiber Technology, vol. 65, pp. 102613, 2021, each incorporated herein by reference in its entirety]. In some embodiments, the sensor 100 may be made using one of, but not limited to, stack and draw technique, sol-gel method, drilling and stacking method, and extrusion. It is observed that the extrusion technique may be most suitable to manufacture the sensor 100 due to a high accuracy and reliability of the extrusion technique [See: M. A. Habib, M. S. Anower, and M. R. Hasan, "Highly birefringent and low effective material loss microstructure fiber for THz wave guidance" Optics Communications, vol. 423, pp. 140-144, 2018; incorporated herein by reference in its entirety].

EXAMPLES

The following examples demonstrate exemplary embodiments of the optical sensor described herein. The examples are provided solely for illustration and are not to be construed as limitations of the present disclosure, as many variations thereof are possible without departing from the spirit and scope of the present disclosure.

Example 1: Geometry of the Optical Sensor

The sensor 100 was subjected to a simulation process. The optical sensor has a single channel hollow core. A ratio between the average diameter (d) and pitch (p) is referred to as air filling fraction (AFF) and the same was maintained throughout the simulation process. The diameter of the hollow core 202 was maintained as $D_c=1.2$ p and the average diameter of the circular-shaped channel 208 was maintained as d=0.6 p. An optimum value of p was determined as 3 μm and the same was preserved throughout a numerical analysis in the simulation process.

During the simulation process, it was observed that when a light beam travels through the hollow core 202, a fraction of the light diverges from the hollow core 202 and propagates towards an outer surface of a waveguide. Following that, a fraction of that the light returned to the hollow core 202 due to reflection. A circular perfectly matched layer (PML) boundary condition was used to avoid such undesirable situation, where a primary function of the PML was to absorb the light incident thereon. Finally, the fused silica was selected as the base material of the sensor 100 due to its properties. A light-dependent refractive index (RI) of the fused silica was calculated using the Sellmier equation [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021, incorporated herein by reference in its entirety], and the numerical values are as presented in Table. 1.

TABLE 1

Refractive index of the fused silica for different operating wavelengths

| Wavelength (μm) | 0.8 | 0.9 | 1.0 | 1.1 | 1.2 | 1.3 | 1.4 | 1.5 | 1.6 | 1.7 | 1.8 |
|---|---|---|---|---|---|---|---|---|---|---|---|
| RI of fused silica | 1.452 | 1.451 | 1.45 | 1.449 | 1.448 | 1.447 | 1.446 | 1.445 | 1.443 | 1.441 | 1.439 |

Example 2: Relative Sensitivity of the Sensor

An overall sensing and propagation characteristic parameters of the sensor 100 were investigated and calculated using the finite element method based on Comsol Multiphysics Version 4.3. In order to ensure accuracy, the wavelength-dependent refractive index of the sulfuric acid was used, where the values were taken from Hasan et. al., [See: M. M. Hasan, T. Pandey, and M. A. Habib, "Highly sensitive hollow core fiber for spectroscopic sensing applications" Sensing and Bio-sensing Research, vol. 34, pp. 100456, 2021], Bulbul et. al., [See: A. A. M. Bulbul, R. H. Jibon, S. K. Das, T. Roy, A. Saha, and M. B. Hossain, "PCF based formalin detection by exploring the optical properties in THz regime" Nanoscience & Nanotechnology-Asia, vol. 11, no. 3, pp. 314-321, 2021, incorporated herein by reference in its entirety], and Rahaman et. al., [See: M. E. Rahaman, R. H. Jibon, H. S. Mondal, M. B. Hossain, A. A. Bulbul, and R. Saha, "Design and optimization of a PCF-based chemical sensor in THz regime," Sensing and Bio-Sensing Research, vol. 32, pp. 100422, 2021, incorporated herein by reference in its entirety]. A critical parameter for any optical sensor is its relative sensitivity which indicates the slightest change in the sample detectable by that sensor. The performance of the sensor 100 is directly proportional to the sensitivity thereof. The mathematical expression for the relative sensitivity of the sensor 100 is given by Eq. 1:

$$r = \frac{n_r}{n_{eff}} \times P \ \% \quad [1]$$

where the relative sensitivity is represented by r, the effective refractive index (RI) of the guided signal and the sample are symbolized by $n_{eff}$ and $n_r$, while P indicates a fraction of total electromagnetic (EM) power that travels through the hollow core 202.

Example 3: Electromagnetic Signal

Figure 5:
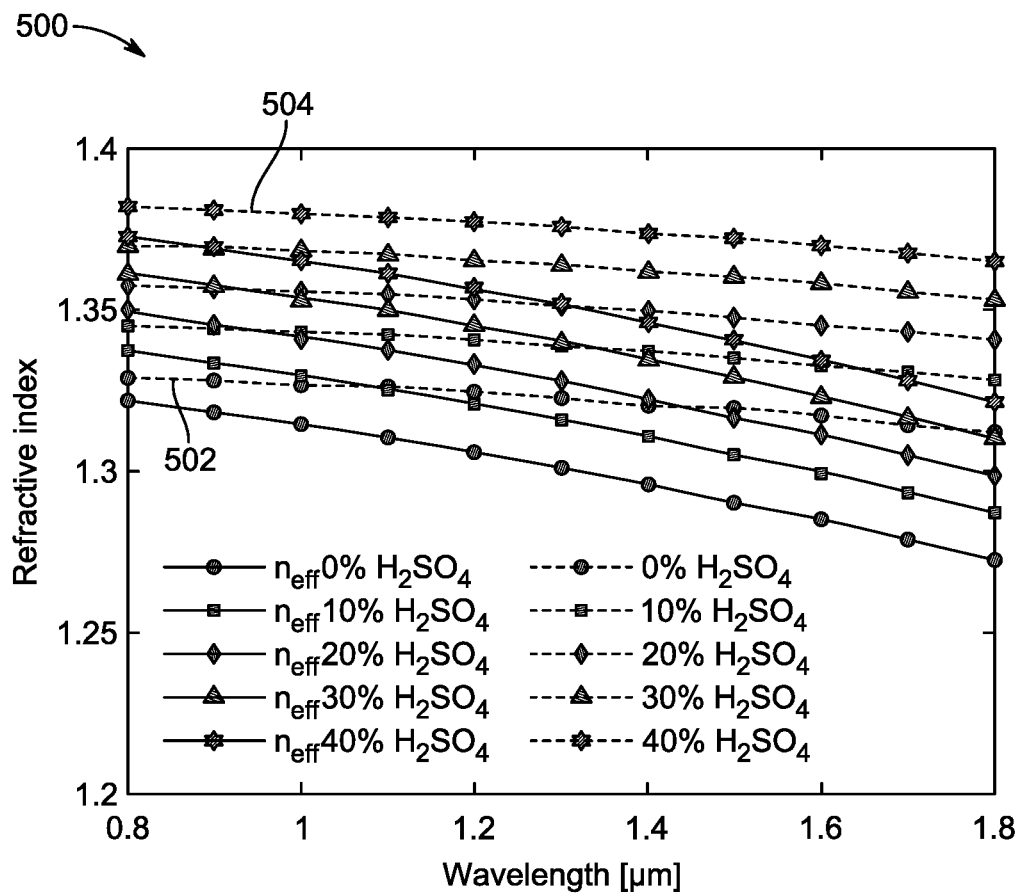
FIG. 5 is a graphical representation of wavelength-dependent refractive index of sulfuric acid for different concentration levels and effective refractive index of a guided electromagnetic signal, according to certain embodiments of the present disclosure.

In Eq. 2, the electric and magnetic fields are represented by E and H, respectively. The subscript x & y represents polarization modes when a signal travels in the z-direction. The wavelength-dependent RI of the sulfuric acid for different concentration levels and the effective RI of guiding light through the hollow core 202 is shown in FIG. 5. In the graph 500 of FIG. 5, graph plot 502 and graph plot 504 correspond to the wavelength-dependent RI of the sulfuric acid for 0% to 40% concentration as reported in Podder et. al. [See: E. Podder, M. B. Hossain, R. H. Jibon, A. A. M. Bulbul, and H. S. Mondal, "Chemical sensing through photonic crystal fiber: sulfuric acid detection," Frontiers in Optoelectronics, vol. 12, pp. 372-381, 2019, incorporated by reference in its entirety]. In addition, solid graph plots in FIG. 5 represent the effective RI of the guided light when the hollow core 202 is filled with the sample (such as the composition described with reference to FIG. 3). The solid graph plots are almost identical to the graph plot 502 and the graph plot 504 as the combined refractive index (PCF material and sample) changes accordingly to the average RI of the hollow core 202. The graph 500 also indicates that the RI of the sulfuric acid decreases with the increase in wavelength.

$$P = \frac{\int_{sample} R_e(E_x H_y - E_y H_x) dx dy}{\int_{total} R_e(E_x H_y - E_y H_x) dx dy} \times 100 \quad [2]$$

Example 4: Power Fraction at Different Operating Wavelengths

Figure 6:
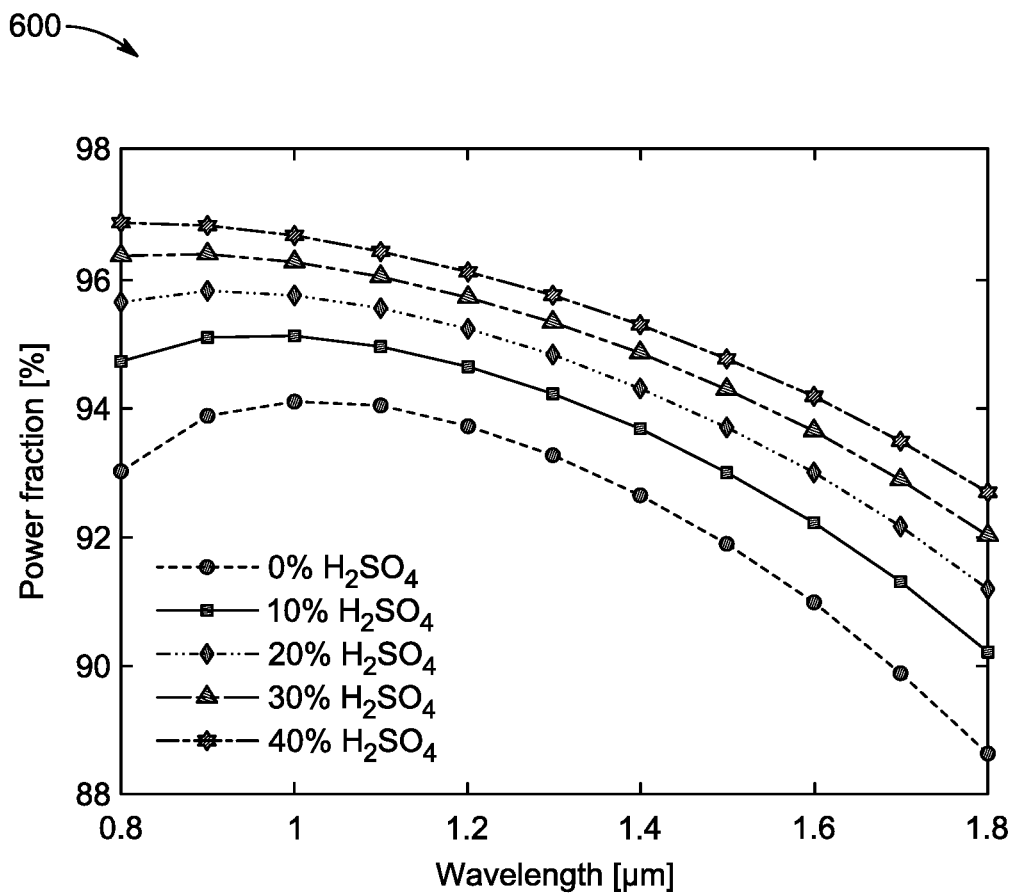
FIG. 6 is a graphical representation of power fraction of the optical sensor at different operating wavelengths, according to certain embodiments of the present disclosure.

FIG. 6 illustrates a graph 600 of power fraction of the sensor 100 at different operating wavelengths for various concentration levels of the sulfuric acid at an optimum core diameter. The FIG. 6 indicates that the power fraction increases for all $H_2SO_4$ concentrations till 1.1 μm. After that, the power fraction decreases. As the relative sensitivity is proportional to P, the optimum wavelength was considered to be 1.1 µm. In addition, the value of P was maximum for 40% concentration of $H_2SO_4$ in water and lowest for pure water (RI=1.33) as the refractive index is maximum for the acid and minimum for water.

Example 5: Sensitivity at Different Wavelengths

Figure 7:
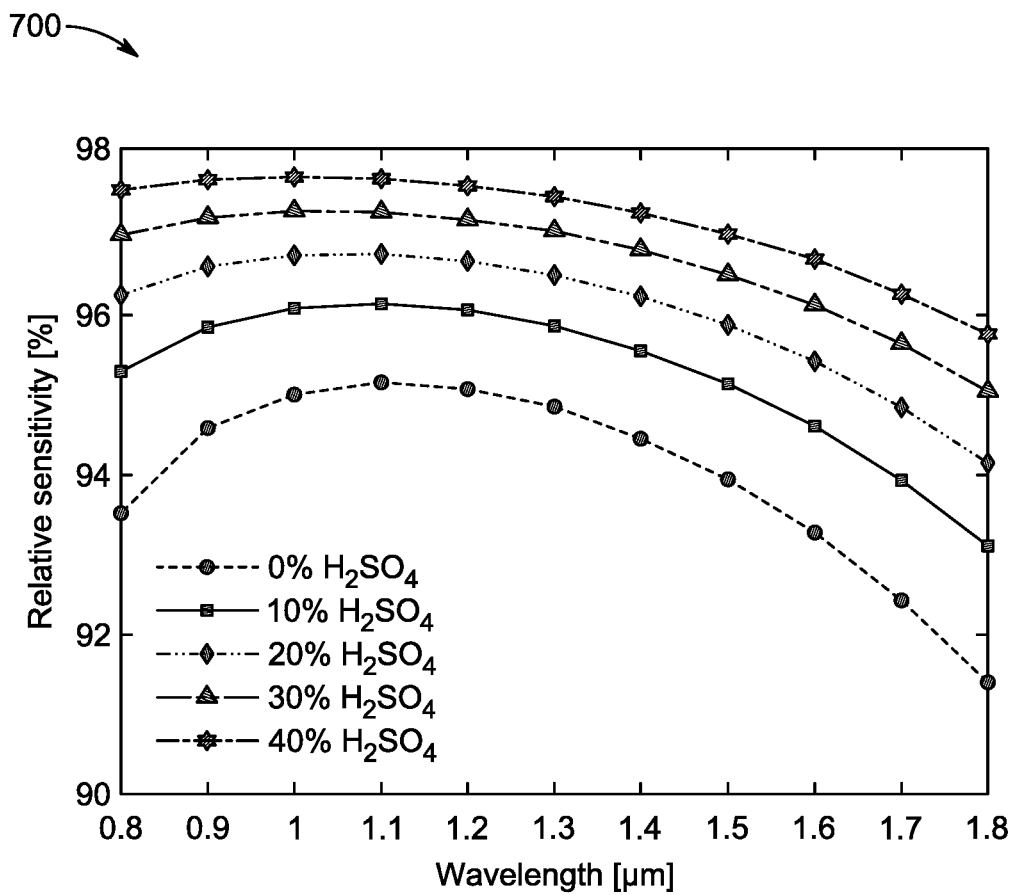
FIG. 7 is a graphical representation of relative sensitivity of the optical sensor at different operating wavelengths, according to certain embodiments of the present disclosure.

FIG. 7 illustrates a graph 700 of relative sensitivity of the sensor 100 at different wavelengths at p=3 µm for various concentration levels of the sulfuric acid as a function of the operating wavelength. Since the value of r was directly proportional to P, the relative sensitivity characteristics were almost identical to graph 600 of FIG. 6. For example, FIG. 7 shows that the relative sensitivities are 97.8%, 97.4%, 96.8%, 96%, and 95% for 40%, 30%, 20%, 10%, and 0% $H_2SO_4$ at a wavelength of 1.1 µm, which were better than the previously proposed sensor in Podder et. al, where a maximum reported sensitivity was around 80%.

Example 6: Confinement Loss at Different Wavelengths

FIG. 8 illustrates a graph 800 of confinement loss of the sensor 100 at different wavelengths for different concentration of $H_2SO_4$. When the EM wave traveled through the hollow core 202 and interacted with the sample (such as the concentration described with reference to FIG. 3) inside the hollow core 202, a fraction of light was trapped by the air holes (such as the circular-shaped channels 208) surrounding the hollow core 202. Such loss is referred to as the confinement loss and it occurs every type of optical waveguide and is calculated by using the Eq. 3 [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021; M. F. H. Arif, K. Ahmed, S. Asaduzzaman, M. A. K. Azad, "Design and optimization of photonic crystal fiber for liquid sensing applications" Photonic Sensors, vol. 6, no. 3, pp. 279-288, 2016; A. A. Rifat, R. Ahmed, G. A. Mahdiraji and F. R. M. Adikan, "Highly Sensitive D-Shaped Photonic Crystal Fiber-Based Plasmonic Biosensor in Visible to Near-IR," in IEEE Sensors Journal, vol. 17, no. 9, pp. 2776-2783, 2017, each incorporated herein by reference in their entirety].

$$L_c = \frac{40\pi}{\ln(10)\lambda} \text{Im}(n_{eff}) \times 10^6 \text{ dB/m} \qquad [3]$$

where λ stands for the operating wavelength and $\text{Im}(n_{eff})$ is an imaginary part of the effective refractive index. From FIG. 8, it was observed that the confinement loss is higher for the lower refractive indexed sample. It was also observed that a tendency of the EM wave was to propagate through the higher refractive indexed region. As the RI of the sample decreases with the increase of water mixture, less light traveled through the hollow core 202, and the confinement loss increased. Such phenomenon was already observed in the graph 700 of FIG. 7, where the power of the hollow core 202 decreases at higher operating wavelengths. That is, more light diverged from the hollow core 202 and was trapped by the cladding air holes (such as the circular-shaped channels 208). As a result, the confinement loss was higher for higher operating wavelengths. At optimum conditions, the sensor 100 exhibited low confinement loss of around $10^{-7}$ to $10^{-9}$ for different concentrations of analyte at 1.1 µm.

Example 7: Numerical Aperture

Another key parameter to evaluate the sensor 100 was the numerical aperture (NA), which is a dimensionless parameter and varies from 0.1 to 0.5. The NA is the maximum incident light angle from the light source 108 that is accepted by the optical fiber. The equation to calculate the NA of the proposed sensor is as below [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021, incorporated herein by reference in its entirety]:

$$NA = \frac{1}{\sqrt{1 + \frac{\pi A_{eff} f^2}{c^2}}} \approx \frac{1}{\sqrt{1 + \frac{\pi A_{eff}}{\lambda^2}}} \qquad [4]$$

where λ is the operating wavelength of the EM signal and $A_{eff}$ is the effective area of the guided light. A relationship between the NA of the sensor 100 and the wavelength is illustrated in FIG. 9 through a graph 900. From the graph 900, it was observed that the NA increases with the increase in the operating wavelength λ. A dominating factor in Eq. 4 is the operating wavelength λ and, as a result of which, the NA was higher at a longer wavelength. Though the effective area increases at a larger wavelength, the NA was mainly dependent on the operating wavelength λ. At optimum wavelength, the sensor 100 offered a numerical aperture of 0.28 which is not previously achieved by any conventional sensors.

In the sensor 100, an effective area was defined as a total area of the sensor 100 where the signal actually propagates from source to destination. The effective area was calculated using [See: M. A. Habib, M. S. Anower, A. Alghamdi, O. S. Faragallah, M. M. A. Eid, and A. N. Z. Rashed, "Efficient way for detection of alcohols using hollow core photonic crystal fiber sensor" Optical Review, vol. 28, pp. 383-392, 2021, incorporated herein by reference in its entirety]:

$$A_{eff} = \frac{\left[\int I(r) r dr\right]^2}{\left[\int I^2(r) dr\right]^2} \qquad [5]$$

where $A_{eff}$ is the effective area and $I(r)=|E_t|^2$ is the electric field intensity of the sensor 100. FIG. 10 illustrates a graph 1000 of the effective area of the sensor 100 at various operating wavelengths. Form the graph 1000, it was observed that the effective area increases as the divergence of the EM wave from the hollow core 202 increased for the larger wavelength. For sensing applications, smaller effective area is desirable so that the maximum light signal may interact with the analyte to achieve increased relative sensitivity. The sensor 100 offered a very small effective area in the range $6 \times 10^{-12}$ m² to $6.4 \times 10^{-12}$ m² at an operating wavelength of 1.1 µm for different concentrations of $H_2SO_4$.

A single-mode propagation parameter which is also termed as V parameter or $V_{eff}$ was also calculated. This parameter indicates whether the sensor 100 will experience multimodal distortion when guiding the EM signal of a particular wavelength/frequency [See: M. A. Habib, E. R. Vera, J. C. V. Aristizabal, and M. S. Anower, "Numerical modelling of a rectangular hollow core waveguide for the detection of fuel adulteration in terahertz region" Fibers, vol. 8, no. 10, pp. 1-17, 2020; and F. Zhang, M. Zhang, X. Liu, and P. Ye, "Design of wideband single-polarization single-mode photonic crystal fiber" Journal of Lightwave Technology, vol. 25, no. 5, pp. 1184-1189, 2007; incorporated herein by reference in their entireties]. The $V_{eff}$ was calculated using [See: M. A. Habib, E. R. Vera, J. C. V. Aristizabal, and M. S. Anower, "Numerical modelling of a rectangular hollow core waveguide for the detection of fuel adulteration in terahertz region" Fibers, vol. 8, no. 10, pp. 1-17, 2020, incorporated herein by reference in its entirety]:

$$V_{eff} = \frac{2\pi}{\lambda} R \sqrt{n_{co}^2 - n_{cl}^2} \quad [6]$$

where R is the radius of the hollow core 202, and the refractive index of the hollow core 202 and the cladding material 206 are indicated by $n_{co}$ and $n_{cl}$ respectively. A numerical value of $V_{eff}$ less than or equal to 2.405 indicates a single-mode fiber. If the numerical value exceeds a threshold value, then the sensor 100 experiences modal distortion. A graphical representation of $V_{eff}$ of the sensor 100 for different operating wavelengths is illustrated in FIG. 11 via a graph 1100. From the graph 1100, it was observed that the numerical value of $V_{eff}$ decreased with an increase in the operating wavelength $\lambda$. As a difference between the refractive index the hollow core 202 and the cladding material 206 reduces with the increase in the operating wavelength, the numerical value of $V_{eff}$ also reduced gradually as seen in FIG. 11. However, it was observed that the numerical value of $V_{eff}$ was less than 2.405 at $\lambda=1.1$ μm for all different concentrations of sulfuric acid samples. Therefore, the sensor 100 guarantees no multimodal distortion and less light reception at a receiving end of the sensor 100.

Further, spot size of the sensor 100 was investigated for different operating conditions. Larger spot size is a desirable parameter for sensing applications as it indicates better light and analyte interaction in the sensor 100. A mathematical relation to evaluate the spot size is as follows [See: A. H. M. I. Ferdous, M. S. Anower, and M. A. Habib, "A hybrid structured PCF for fuel adulteration detection in terahertz regime," Sensing and Biosensing Research, vol. 33, pp. 100438, 2021; M. R. H. Khan, F. M. Ali, and M. R. Islam, "THz sensing of Covid-19 disinfection products using photonic crystal fiber" Sensing and Biosensing Research, vol. 33, pp. 100447, 2021; and A. Panda, and P. D. Pukhurambam, "Design and analysis of porous core photonic crystal fiber based ethylene glycol sensor operated at infrared wavelengths" Journal of Computational Electronics, vol. 20, pp. 943-957, 2021, each of which is incorporated herein by reference in its entirety]:

$$W_{eff} = R \times (0.65 + 1.619 \times V^{-1.5} + 2.879 \times V^{-6}) \quad [7]$$

where $W_{eff}$ is the effective spot size, R is the radius of the core, and V is the normalized V-parameter. A relationship between the spot size and the operating wavelength is shown in FIG. 12 through a graph 1200 where the values of $W_{eff}$ increased with the operating wavelength. As all the parameters of the sensor 100 were reported at an operating wavelength of 1.1 μm, A value of the spot size at an operating wavelength of 1.1 μm was observed as 1.5 μm, which was higher than corresponding values of conventional sensors.

The present disclosure provides a highly sensitive sensor 100 to determine the concentration level of sulfuric acid in water. Owing to the circular structures of the hollow core 202 and the cladding material 206, any complexity in fabricating the sensor 100 may be reduce. From the experimental results, it may be observed that, at optimum structural and operating conditions, the sensor 100 offers very high relative sensitivity (more than 97%), low confinement loss ($10^{-9}$ dB/m), high numerical aperture (0.28), and favorable spot size.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:

1. A method of determining a concentration of an analyte in a composition, the method comprising:
    passing a composition through an optical sensor, wherein the optical sensor comprises:
        a photonic crystal fiber (PCF), having:
            a hollow core;
            an inner cladding section comprising a cladding material and a plurality of spaced apart circular-shaped channels disposed in the cladding material surrounding the core; and
            an outer layer surrounding the inner cladding section;
            wherein the hollow core has a first diameter (Dc);
            wherein the cladding material comprises at least one of glass, ceramic, and glass-ceramic;
            wherein each spaced apart circular-shaped channel has substantially the same size and an average diameter (d); and
        an optical coupler;
        wherein a first end of the photonic crystal fiber is in optical communication with a light source; and
        wherein a second end of the photonic crystal fiber is in optical communication with the optical coupler
    wherein the composition is passed through the optical sensor via the hollow core;
    exposing the composition in the hollow core to laser light such that a portion of the laser light is propagated through the hollow core of the optical sensor and the composition to form propagated light; and
    detecting the propagated light via the optical coupler;
    wherein the analyte comprises a molecule having a formula (I)

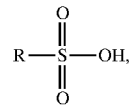

wherein R is selected from the group consisting of a hydroxy group, an aryl group, a trifluoromethyl group, a C1 to C6 alkyl group, and a C1 to C6 alkoxy group.

2. The method of claim 1, wherein the analyte is sulfuric acid, and wherein sulfuric acid is present in the composition at a concentration of up to 50 wt. % based on a total weight of the composition.

3. The method of claim 1, wherein the composition in the hollow core is exposed to light having a wavelength in a range of 0.5 to 2.0 μm, has a sensitivity of 88% to 98% towards sulfuric acid presented in a sulfuric acid solution having a concentration of 5 to 45 wt. %.

4. The method of claim 1, when the composition in the hollow core is exposed to light having a wavelength of 1.1 μm, has a numerical aperture (NA) value of 0.2 to 0.35.

5. The method of claim 1, when the composition in the hollow core is exposed to light having a wavelength of 1.1 μm, has a low confinement of $10^{-15}$ to $10^{-5}$ dB/m.

6. The method of claim 1, when the composition in the hollow core is exposed to light having a wavelength of 1.1 μm, has an effective area of $5 \times 10^{-12}$ to $7.5 \times 10^{-12}$ m$^2$.

7. The method of claim 1, when the composition in the hollow core is exposed to light having a wavelength of 1.1 μm, has a spot size of 1 to 2 μm.

8. The method of claim 1, when the composition in the hollow core is exposed to light having a wavelength of 1.1 μm, has a single-mode propagation and a V parameter ($V_{eff}$) value less than or equal to 2.405.

* * * * *